(12) United States Patent
Kaiser-Pendergrast

(10) Patent No.: US 9,195,901 B2
(45) Date of Patent: Nov. 24, 2015

(54) SYSTEM AND METHOD FOR DETECTING TARGET RECTANGLES IN AN IMAGE

(71) Applicant: Victor Kaiser-Pendergrast, Stockholm, NJ (US)

(72) Inventor: Victor Kaiser-Pendergrast, Stockholm, NJ (US)

(*) Notice: Subject to any disclaimer, the term of this patent is extended or adjusted under 35 U.S.C. 154(b) by 296 days.

(21) Appl. No.: 13/860,362

(22) Filed: Apr. 10, 2013

(65) Prior Publication Data

US 2013/0279749 A1    Oct. 24, 2013

Related U.S. Application Data

(60) Provisional application No. 61/622,306, filed on Apr. 10, 2012.

(51) Int. Cl.
  *G06K 9/00*  (2006.01)
  *G06K 9/46*  (2006.01)
(52) U.S. Cl.
  CPC ............. *G06K 9/4604* (2013.01); *Y10S 901/46* (2013.01)
(58) Field of Classification Search
  None
  See application file for complete search history.

(56) References Cited

U.S. PATENT DOCUMENTS

| | | | |
|---|---|---|---|
| 5,568,571 A * | 10/1996 | Willis et al. | 382/254 |
| 8,632,376 B2 * | 1/2014 | Dooley et al. | 463/63 |
| 2005/0271248 A1 * | 12/2005 | Teku et al. | 382/103 |
| 2007/0272755 A1 * | 11/2007 | Chang et al. | 235/462.11 |
| 2009/0040312 A1 * | 2/2009 | Hattori | 348/187 |
| 2009/0081923 A1 * | 3/2009 | Dooley et al. | 446/456 |
| 2012/0080523 A1 * | 4/2012 | D'urso et al. | 235/404 |
| 2013/0121595 A1 * | 5/2013 | Kawatani et al. | 382/199 |
| 2013/0182002 A1 * | 7/2013 | Macciola et al. | 345/589 |

OTHER PUBLICATIONS

Park, Real Time Multi-Square Detection and Tracking, Apr. 2012, Wentzville Holt High School, Retrieved from www.chiefdelphi.com/media/papers/download/3629 Real Time Multi-Square Detection and Tracking.*
Parker et al., An Approach to License Plate Recognition, 1996, University of Calgary, Retrieved from http://pages.cpsc.ucalgary.ca/~federl/Publications/LicencePlate1996/licence-plate-1996.pdf.*

* cited by examiner

*Primary Examiner* — Jason Heidemann
(74) *Attorney, Agent, or Firm* — Winston & Strawn LLP

(57) ABSTRACT

A system and method for detecting target rectangles in an image acquired from a camera or computer file in which average pixel values from small horizontal and vertical rectangles called sub-exlons are computed from an edge-detected and binarized version of the image. The sub-exlons are then used to scan for exlons, which are combinations of horizontal and vertical sub-exlons that make up the four possible types of corner (upper left, upper right, lower left, and lower right). Possible corners that are located are then matched up and a rectangle is confirmed by scanning for properly oriented horizontal and vertical connecting lines composed from the previously computed sub-exlons. All confirmed rectangles are stored in an array of found rectangles, which is then processed to filter out rectangles of the wrong aspect ratio. Finally, the most prevalent concentric group of rectangles is located by rejecting rectangles whose geometric center is too far from the center of mass of the entire group of located rectangles. This final group of concentric rectangles is then used to automatically target a robotic shooting mechanism or to provide feedback to robot operators for manual targeting.

20 Claims, 8 Drawing Sheets

800

| 1 | 0 | 0 | 0 | 1 | 1 | 1 | 1 | 1 | 1 | 1 |
| 1 | 0 | 1 | 1 | 0 | 1 | 1 | 1 | 0 | 1 | 1 |
| 1 | 0 | 1 | 0 | 1 | 0 | 1 | 1 | 0 | 0 | 1 |
| 1 | 1 | 0 | 1 | 1 | 1 | 1 | 0 | 0 | 0 | 1 |

FIGURE 8

SYSTEM AND METHOD FOR DETECTING TARGET RECTANGLES IN AN IMAGE

FIELD OF THE INVENTION

The present invention generally relates to systems and methods for detecting target rectangles in an image and more particularly to systems and methods for locating target rectangles from a stream of video images in real time. The present invention is particularly applicable to mobile processor environments which have limited processor speed.

BACKGROUND OF THE INVENTION

In robotic competitions such as the FIRST Robotics Competition (FRC), it is often necessary for a robot to locate rectangular targets. These targets mark goals that the robot must locate in order to score a game element. For example, in the 2011-2012 FRC competition season, rectangles made of reflective tape marked the location of several basketball hoops, and robots had to score a foam basketball game element into said hoops in order to win the game.

Existing methods of target location that are commonly used in FRC robotics competitions and in the industry include blob detection and feature detection techniques such as the probabilistic Hough Transform (embodied in rectangle detection software such as the OpenCV public domain image processing library).

When evaluating the use of these existing methods for robot target detection, two criteria must be applied: (1) "Does the method accurately find the center of the target rectangle?"; and (2) "Can the method be run at a high enough frame rate (images processed per second) to allow the robot to adjust its firing mechanism in real time under game conditions on the low end computing hardware allowed in the competition?" A frame rate on the order of 15 to 20 frames per second is the absolute minimum that is effective in this kind of application.

A prior art method known as blob detection entails either looking for a specific color or areas where there are high levels of contrast. This method is fast because the actual processing is not very complicated and does not involve large numbers of steps. However, tests showed that the method does not provide a sufficiently accurate identification of the center of a target to score game elements with a high degree of certainty. Therefore, blob detection passes the frames-per-second test but fails to find the target center accurately enough to actually score points in many common situations.

The prior art also includes various kinds of feature detection algorithms to find rectangles. These are more complicated methods than blob detection, but can yield additional data and more accurate rectangle size and position information. Such methods generally involve finding line segments in an image and then attempting to form shapes from them. Using feature detection, a definite center to a shape can be identified, as opposed to only an estimate provided by blob detection. In tests undertaken in the development of the present invention, it was discovered that OpenCVs probabilistic Hough Transform, a method known in prior art, was accurate in identifying target centers, but was far too slow to provide real time feedback to the robot in order to acquire the target for scoring purposes. In addition, the Hough Transform algorithm required a very pristine image in order to operate. Real world images always contain significant noise, and to make the algorithm effective in practice would require extensive noise filtering to preprocess the image, which would make it even slower.

SUMMARY OF THE INVENTION

The present invention offers a very rapid way to analyze data coming from an inexpensive camera or other imaging source and then accurately locate the centers of target rectangles while rejecting non-target rectangles in the field of view with a high degree of confidence. As outlined above, other available methods are either not fast enough to run on the inexpensive computers allowed in robotic competitions, or are too inaccurate to properly facilitate scoring game elements in the goals indicated by the targets.

The present invention works very well on inexpensive mobile devices such as smart phones, and is optimized to take advantage of multicore CPU architectures, as many aspects of the present invention's process may be easily split up to take advantage of multiple threads of execution. This ability to run tasks in parallel is an advantage over many existing processes.

Because of these advantages of the present invention, tests conducted showed that on low-end netbook hardware the present invention could locate target rectangles accurately at 39 to 40 frames per second as compared to the OpenCV Probabalistic Hough Transform speed of only 11 to 12 frames per second. When controlling robot hardware in real time, a fast frame rate is essential, otherwise the motors used to move the shooting system may "overshoot" the target and require far more time to acquire the target for scoring.

The present invention is a system and method for detecting target rectangles in an image acquired from a camera or computer file. Average pixel values from small horizontal and vertical rectangular areas called sub-exlons are computed from an edge-detected and binarized version of the image. The sub-exlons are then used to scan for exlons, which are combinations of horizontal and vertical sub-exlons that make up the four possible types of corner (upper-left, upper-right, lower-left, and lower-right). Possible corners that are located are then matched up and a rectangle is confirmed by scanning for properly oriented horizontal and vertical connecting lines composed from the previously computed sub-exlons. All confirmed rectangles are stored in an array of found rectangles, which is then processed to filter out rectangles of the wrong aspect ratio. Finally, the most prevalent concentric group of rectangles is located by rejecting rectangles whose geometric center is too far from the average of the centers the group of located rectangles. After filtering, the final group of concentric rectangles is then used to automatically target a robotic shooting mechanism or to provide feedback to robot operators for manual targeting.

An exemplary embodiment of the invention may include a method for detecting a target rectangle in an image, starting by capturing a color or grayscale image into computer memory from an image source such as a camera or computer file. This captured image is then transformed using an edge detection process into a grayscale edge detection image in which darker areas represent areas of higher contrast. The grayscale edge detection image is then binarized into a binary image using an process that transforms picture elements whose grayscale value is lower than a threshold to completely black and transforms picture elements equal or higher this threshold to completely white. After binarizing the image, horizontal and vertical sub-exlons for each picture element in the binary image are identified, resulting in horizontal and vertical sub-exlon arrays for the binary image. Computing sub-exlons entails computing the sum of picture element values in a horizontal or vertical rectangle starting at the picture element in question. Sub-exlons serve as primitive feature elements. Sub-exlons may be computed in parallel using multiple threads of execution. While the sub-exlons are being computed, another thread scans through the sub-exlon arrays in order to piece them together into exlons, which are corner elements. The exlon is composed of a horizontal and vertical sub-exlon at a given location in which both sub-exlons have summed values that indicate a nearly white area or nearly dark area. Once one type of corner is found (for example an upper-left corner), then matching exlons located by the exlon computation process are used to piece together the four required corner types to for a rectangle (upper right, upper left, lower right, lower left), while also confirming that there are proper connecting horizontal and vertical lines between said corners. This confirmation is performed by consulting the sub-exlon arrays to ensure the corners are substantially connected by the correctly oriented (horizontal or vertical) lines. After they have been confirmed, the rectangles are stored in a found rectangle array. Once the image has been completely scanned and all rectangles are in the found rectangle array, the found rectangles are filtered to remove from it rectangles that do not have an aspect ratio near any of the desired aspect ratios of the target rectangles, resulting in a filtered rectangle array. The center of the filtered rectangle array is computed, and any rectangle whose geometric center is too far (as determined by a threshold value) from the average center of the entire set of rectangles is removed from the filtered rectangle array. The farthest such rectangle being removed first with the average center being recomputed). This process continues until all rectangles remaining in the filtered rectangle array have geometric centers closer than the desired threshold value. This process results in a final target rectangle center position. Finally, the computed target rectangle position is used to generate targeting commands to aim a robotic firing mechanism such that the camera is pointed at the target. Alternatively or in combination with this targeting action, the system provides signals to human robot operators to inform them of the status of the targeting process. These signals can include signaling the human drivers that no target rectangles are in range or that the limit of the robot's ability to move the shooting mechanism has been reached without centering the target. In such a case the drivers are signaled as to how to move the robot physically to bring the target back in range.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 8 shows how a sub-exlon is computed at a given pixel position.

DETAILED DESCRIPTION OF THE INVENTION

Figure 1:
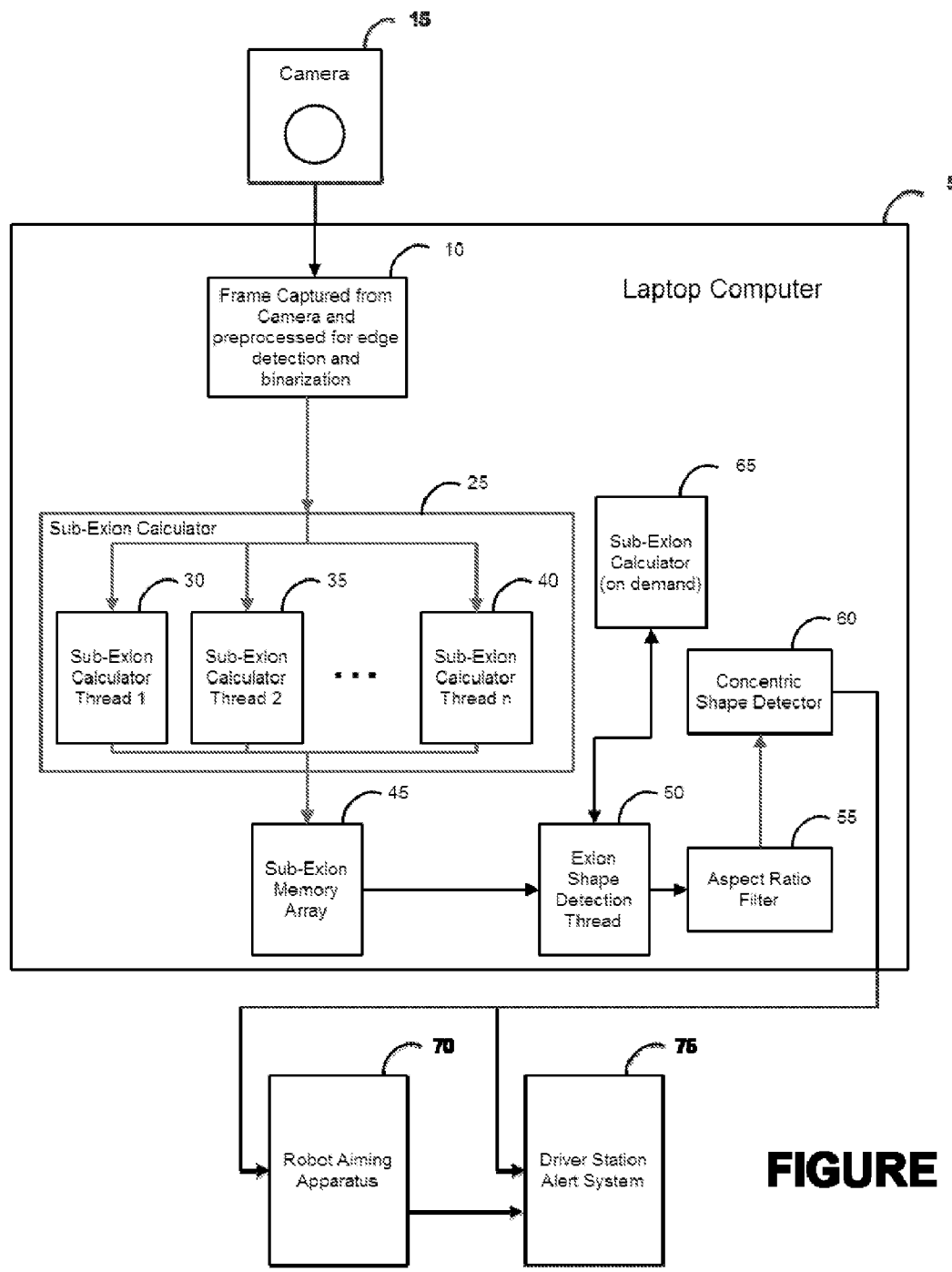
FIG. 1 depicts an exemplary system that embodies the present invention.

FIG. 1 illustrates a system according to the present invention. With reference to FIG. 1, a raw image is acquired by a computer 5 from an image source such as a camera 15. The raw image may be color or grayscale and is represented in the computer image memory 10 as picture elements, also known as pixels by those skilled in the art.

Figure 2:
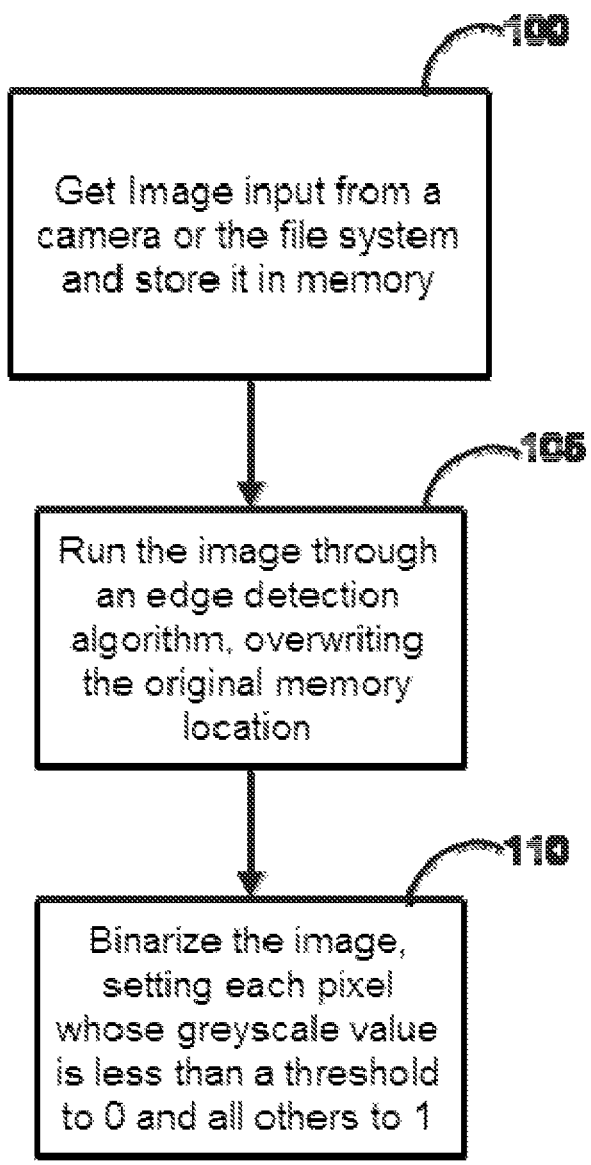
FIG. 2 illustrates the steps required to acquire and process an incoming image to prepare it for target detection.

The raw image is passed through a filtering process. As shown in FIG. 2, the filtering process consists of an edge detection process 105 and a binarization process 110. In step 100, the system captures the frame image into a frame memory 10 (FIG. 1). The edge detection process 105 transforms the image into a grayscale edge detection image which is also stored in computer memory. In areas of the image where there is a high contrast, the edge detection image will have a dark pixel value. Areas with little or no contrast show up as white pixel values, and areas with a medium amount of contrast will show up as a proportional grayscale pixel value in the edge detection image. Numerous types of edge detection processes are known to those skilled in the art and many variations would be suitable for use as a component of the present invention.

With further reference to FIG. 2, the edge detection image that results from the edge detection process 105 is binarized using a binarization process 110, resulting in a binary image. The binarization process 110 works in a simple manner. Any pixel in the edge detection image that has less than a threshold pixel value is transformed to be completely black and is assigned a pixel value of 0. Any other pixel is considered to be completely white and receives a value of 1. Not only is this memory efficient, as each pixel can be represented by a single bit as opposed to a larger grayscale value, but using this binarized representation will also speed up calculations later. The binary image is stored in computer memory.

A sub-exlon is defined in the present invention as the sum of a set of binarized pixel values in a rectangular area of predefined shape and size. There are two types of sub-exlon according to the present invention: horizontal sub-exlons and vertical sub-exlons. FIG. 8 illustrates an example of the computation of a horizontal sub-exlon. In FIG. 8, binarized image pixel values (1 for white and 0 for black) are shown in the boxes laid out horizontally and vertically in a grid. A real image would of course have far more pixels than this simple example. The horizontal sub-exlon identification process starts at the pixel box labeled 800. In the example illustrated in FIG. 8, the size of the horizontal sub-exlon is predetermined to be 8 pixels wide by 2 pixels high. The heavy black rectangle, which is 8 columns wide and two rows high, shows the pixels that are included in the horizontal sub-exlon computation. The value of the horizontal sub-exlon is simply the sum of the pixel values enclosed by the heavy black rectangle in FIG. 8. In this example, the sub-exlon has a value of 11. A vertical sub-exlon would be computed the same way, but the rectangular area would, for example, be 8 rows high and 2 columns wide. In other words a vertically oriented version of the same sized rectangular area as shown in FIG. 8. The precise size of the sub-exlon, i.e., the number of rows and columns in the rectangular area, is a system parameter, but it is always small compared to the overall number of horizontal and vertical pixels in the actual image. The sub-exlons would appear to be small horizontal and vertical lines on the scale of the entire image.

Figure 3:
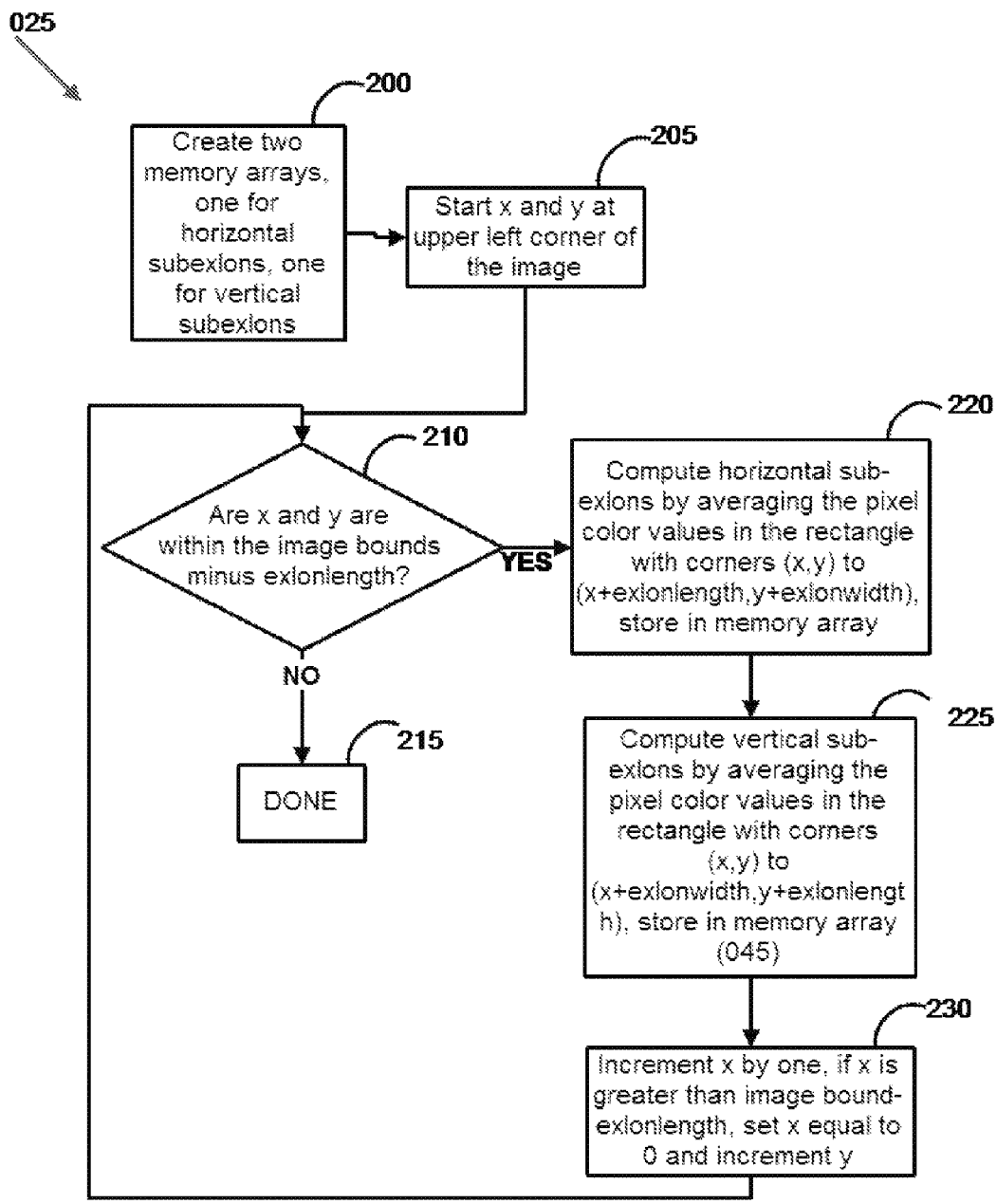
FIG. 3 is the process for computing sub-exlons in the binarized image. This process may run in multiple simultaneous threads as shown on FIG. 1.

Returning to FIG. 1, for each pixel in the binary image, horizontal and vertical sub-exlons are calculated by a sub-exlon calculator 25. After the sub-exlons have been identified, the coordinates of each of the identified sub-exlons are stored in horizontal and vertical sub-exlon arrays 45. With reference to FIG. 3, two memory arrays are created for a given pixel 200. As described above, for each pixel, starting at the upper left corner of the image 205, a sub-exlon is simply the sum of the binary values of pixels in a rectangular group of pixels surrounding the target pixel. For a horizontal sub-exlon the rectangle is oriented horizontally 220 and for a vertical sub-exlon the rectangle is oriented vertically 225 for purposes of these computations. Looping constructs 230, 210 continue these computations until all sub-exlons are stored in the sub-exlon arrays, at which point the sub-exlon calculator 25 is done 215.

As previously mentioned, the size of the horizontal or vertical rectangular area used to define a sub-exlon is a system parameter. For example, in a test implementation using a 640 pixel wide by 480 pixel tall binary image, vertical sub-exlons of size two pixels wide by twelve pixels tall were found to work well, and correspondingly the horizontal sub-exlons in this implementation were twelve pixels wide by two pixels tall. On the scale of the image, a horizontal sub-exlon is simply a small dash in the image while a vertical sub-exlon appears as a small vertical line.

Given the x, y coordinate of a particular pixel, the sub-exlon arrays 45 can be used to quickly determine whether there is a nearly-black or nearly-white corner shape (oriented in any of the four typical corner shapes: upper left, upper right, lower left, or lower right). In practice, this computation does not happen all at once as this would create a bottleneck. Rather, as shown in FIG. 1, sub-exlons are computed as they are needed and cached to an array for possible future access. At the same time, in the background, one or more processor threads 30, 35, 40 may be run in parallel to pre-calculate sub-exlons in case they are needed by other parts of the process.

Once the sub-exlons have been identified and stored in memory, the rectangle matching logic begins. The rectangle matching is accomplished by the Exlon shape detection thread 50 which is illustrated at a high level in FIG. 7. Upper-left corners are first sought out by scanning the sub-exlon arrays from left to right and top to bottom in steps 705 and 710 (denoted as block 700) in a process that will be described in more detail below in reference to FIG. 4. Once an upper-left corner is located, the sub-exlon arrays are again scanned in a rightward direction looking for an upper-right corner. If an upper-right corner is located in an acceptable position (defined by a threshold) then the horizontal sub-exlon array is scanned to ensure there is a connecting horizontal line. This process then proceeds in a downward direction to locate the lower-right corner, and again if one is located, the vertical sub-exlon array is used to ensure there is a connecting vertical line. Finally, the sub-exlon arrays are scanned starting at the lower-right corner and proceeding leftward until a matching lower-left corner is located. Again it is confirmed that the lower left hand corner is connected to the lower right hand corner via a horizontal line using the horizontal sub-exlon array.

Figure 4:
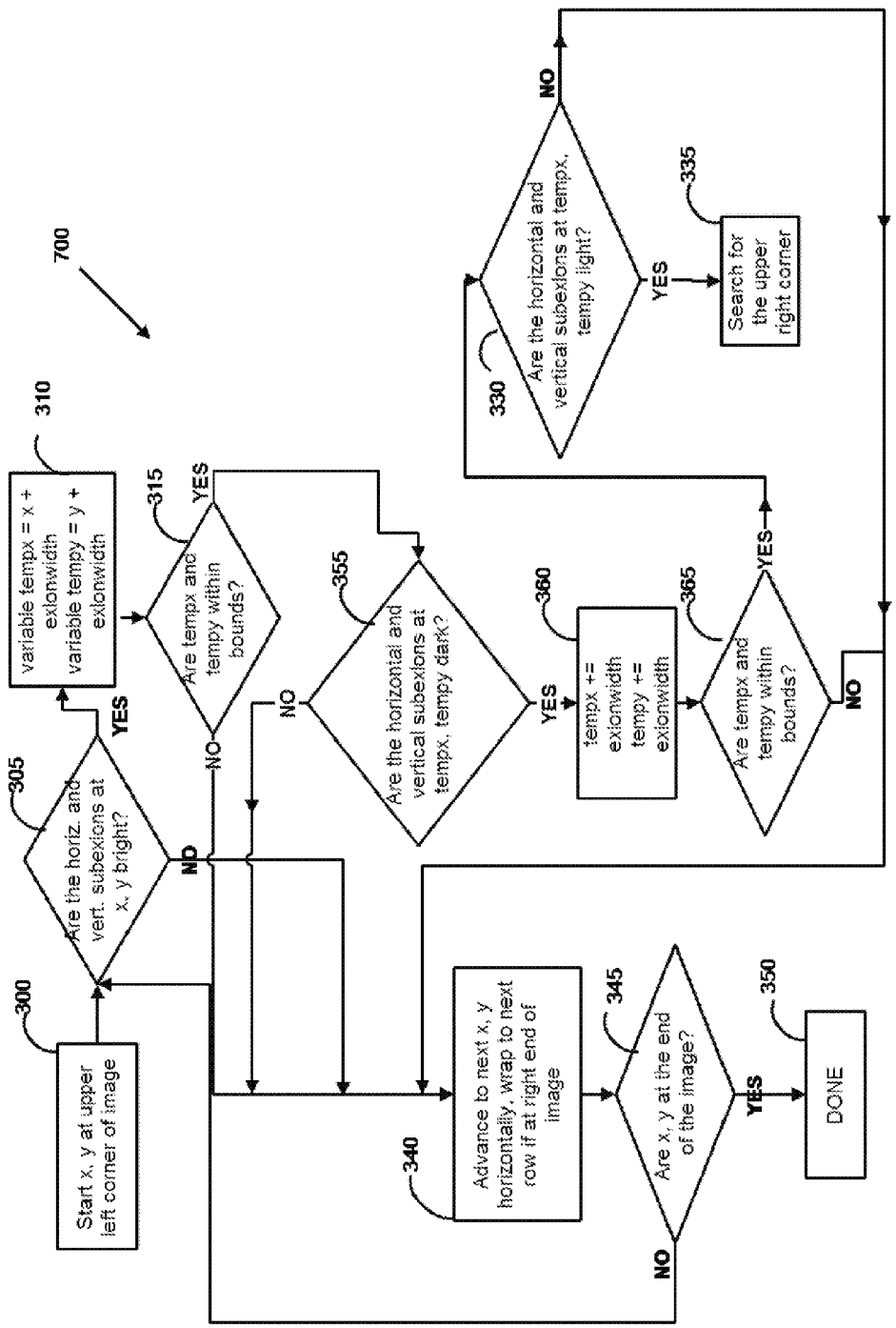
FIG. 4 illustrates in detail the part of the Exlon shape detection process which detects upper-left corners.

By way of further clarification on the manner in which the sub-exlon arrays are used to piece together exlons (corners), reference is made to FIG. 4. FIG. 4 shows in detail the location of the upper-left corner which is marked as block 700 in FIG. 7. Sub-exlons are pieced together to form exlons, which simply look like "L" shapes of different orientations to match the different orientations of corners of a rectangle. For example, a lower left corner does indeed look like a letter "L" but an upper right corner looks like an upside-down letter "L". First the upper-left corner is searched for in a top left to bottom right fashion starting at block 300 in FIG. 4. The process looks, step 305, for an exlon with an almost completely white value. After finding one, the process then searches one sub-exlon width to the right and one sub-exlon width down, diagonally 310. If the new search position is within the image bounds 315, then continue to block 355. If the new search position is not within bounds, the process increments x, advancing to the next row if necessary 340. If the new search position is in bounds, the process checks if the exlon there is almost completely black 355, then the process checks down and right to see if there is another almost completely white exlon 360, 365, 330. This indicates an upper left hand corner exists at that point and that an upper right corner can be searched for 335. If the process fails to find white, then a black, and then another white exlon at any point, the process advances to incrementing the search coordinates 340. The incremented search coordinates are checked whether or not they are at the end of the image. If they are not at the end of the image, the search starts at these incremented search coordinates, otherwise the upper left corner detection is done 350.

Figure 7:
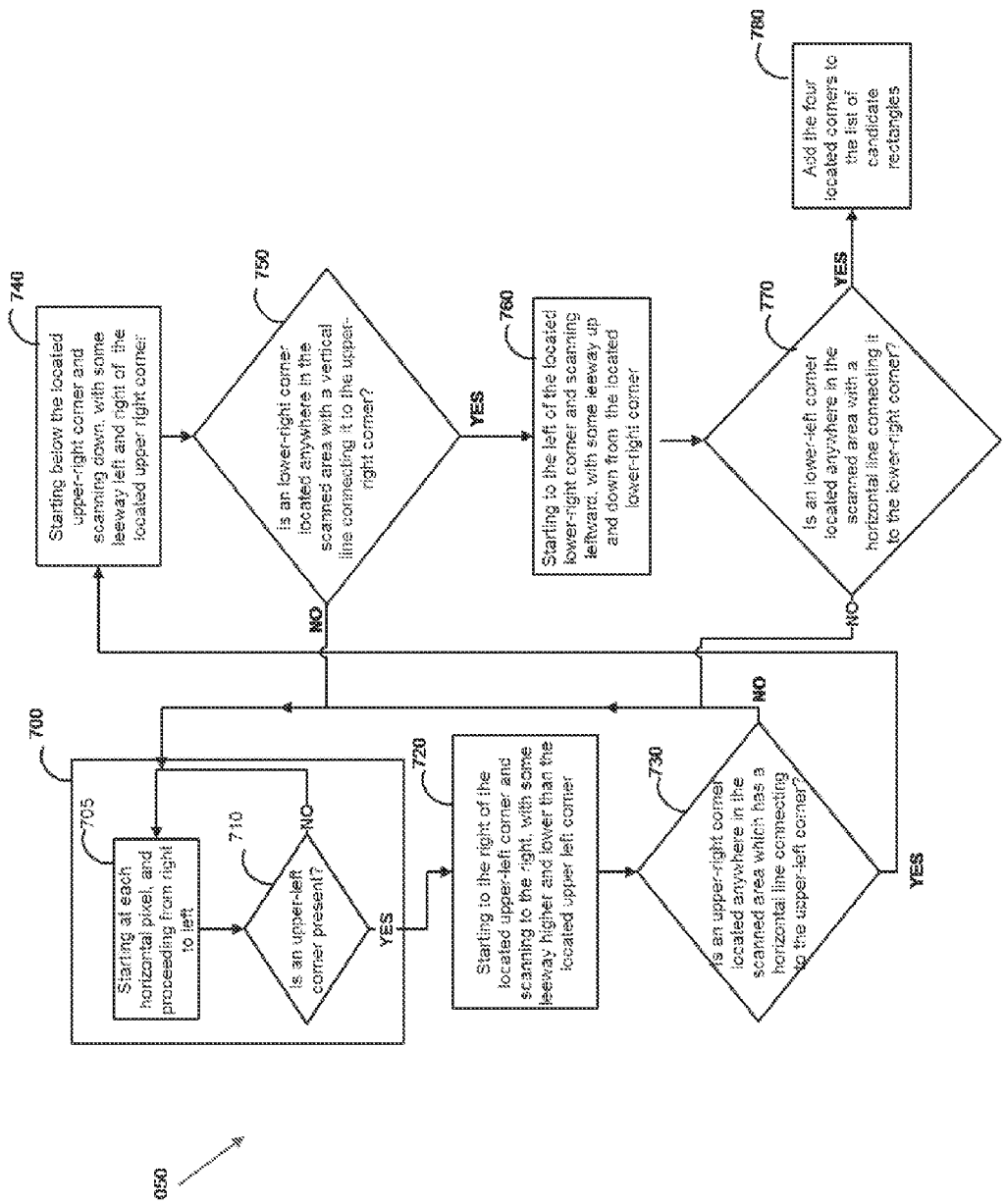
FIG. 7 illustrates at a high level the Exlon shape detection process' method of locating and confirming rectangle corner positions.

With continuing reference to FIG. 7, after an upper left hand corner is found, the process searches to the right for the right hand corner 720. The method used to find the other corners 7 (720, 730, 740, 750, 760, 770) are essentially identical to that illustrated by FIG. 4 for the upper-left corner. The only difference is, for example, with the upper-right corner, one would look for a horizontal sub-exlon ending at a pixel value plus a vertical sub-exlon starting at that same pixel, as that forms the requisite upper-right corner shape. The only other slight difference is that in scanning for the other corners (after the upper-left is located); the upper right hand corner's Y coordinate is assumed to be within a pre-specified margin, which is a system parameter, higher or lower than the located upper-left corner. If all of the corners are found, the corners are added to a list of candidate rectangles corners 780.

Figure 5:
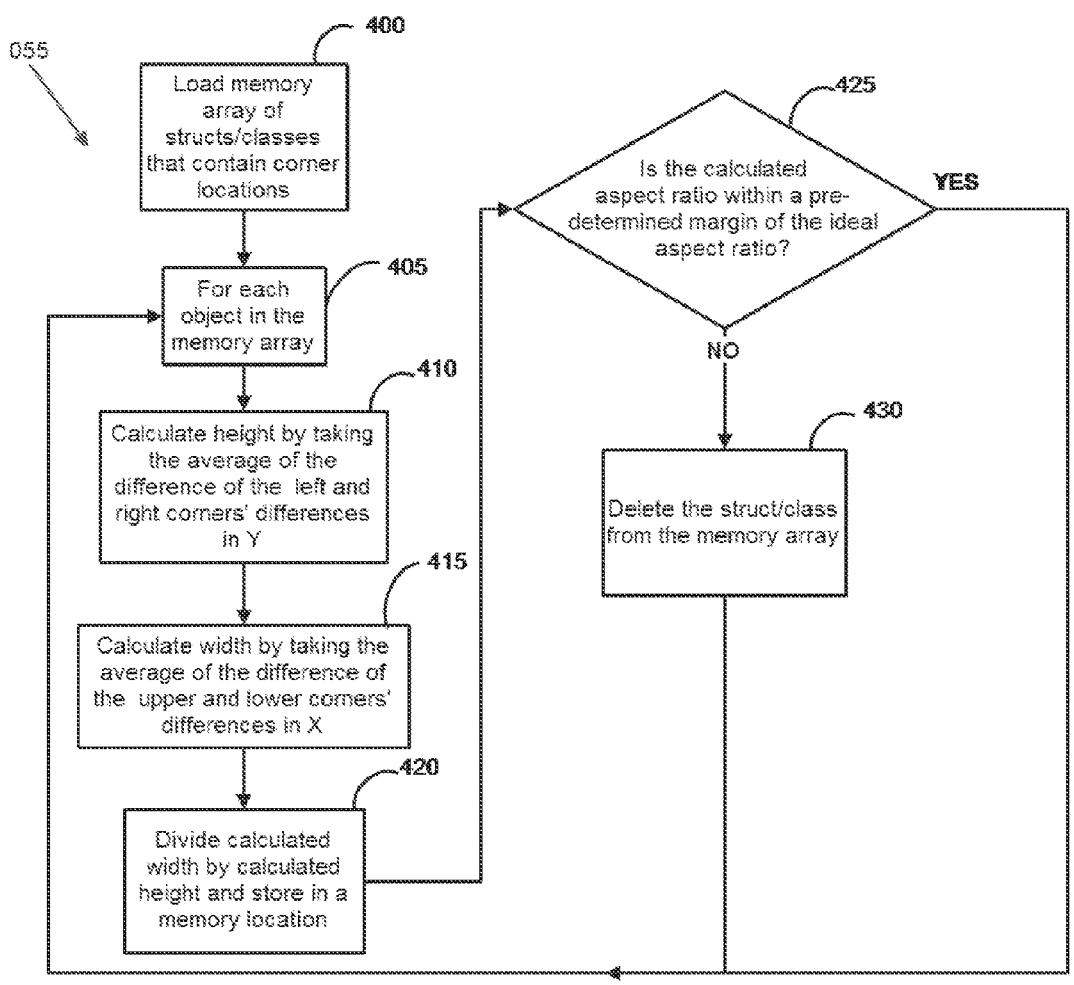
FIG. 5 depicts the process of filtering items in the rectangle list by aspect ratio.

With reference to FIG. 5, after finding the candidate rectangles and recording their corner locations as described above with respect to FIG. 7, the aspect ratio filter 55 is used. The memory array with the candidate centers is loaded 400. For each item in the memory array 405, the height and width of the rectangle can be calculated 410, 415. The width may be divided by the height to obtain the rectangle's aspect ratio 420. This aspect ratio may be compared to the ideal aspect ratio expected of a true target rectangle. If this comparison finds that the rectangle's aspect ratio deviates more than a threshold amount from the ideal (a predetermined, expected rectangle aspect ratio), then the rectangle is removed from the list of candidate target rectangles 425, 430. This process filters out false-positive rectangles, which may be in the image for example because windows, doors, banners, signs, or other rectangular structures that may be present in the arena alongside the real target rectangles.

It will be appreciated by those skilled in the art that the comparison of a candidate rectangle with the ideal aspect ratio may include the possibility that there is more than one kind of goal and therefore more than one acceptable aspect ratio. For example, if there were two types of goals, one of which had a target rectangle with an aspect ratio of 1.5, and another with an aspect ratio of 2.0, then one skilled in the art would know that two comparisons could be made to allow a candidate rectangle to match either of these two acceptable target rectangle aspect ratios. In practice, a threshold range of values that varies somewhat from the ideal is allowed. For example, for a target rectangle with an ideal aspect ratio of 2.0, the comparison might be formulated to accept any ratio between 1.9 and 2.1 as falling in the acceptable range.

Figure 6:
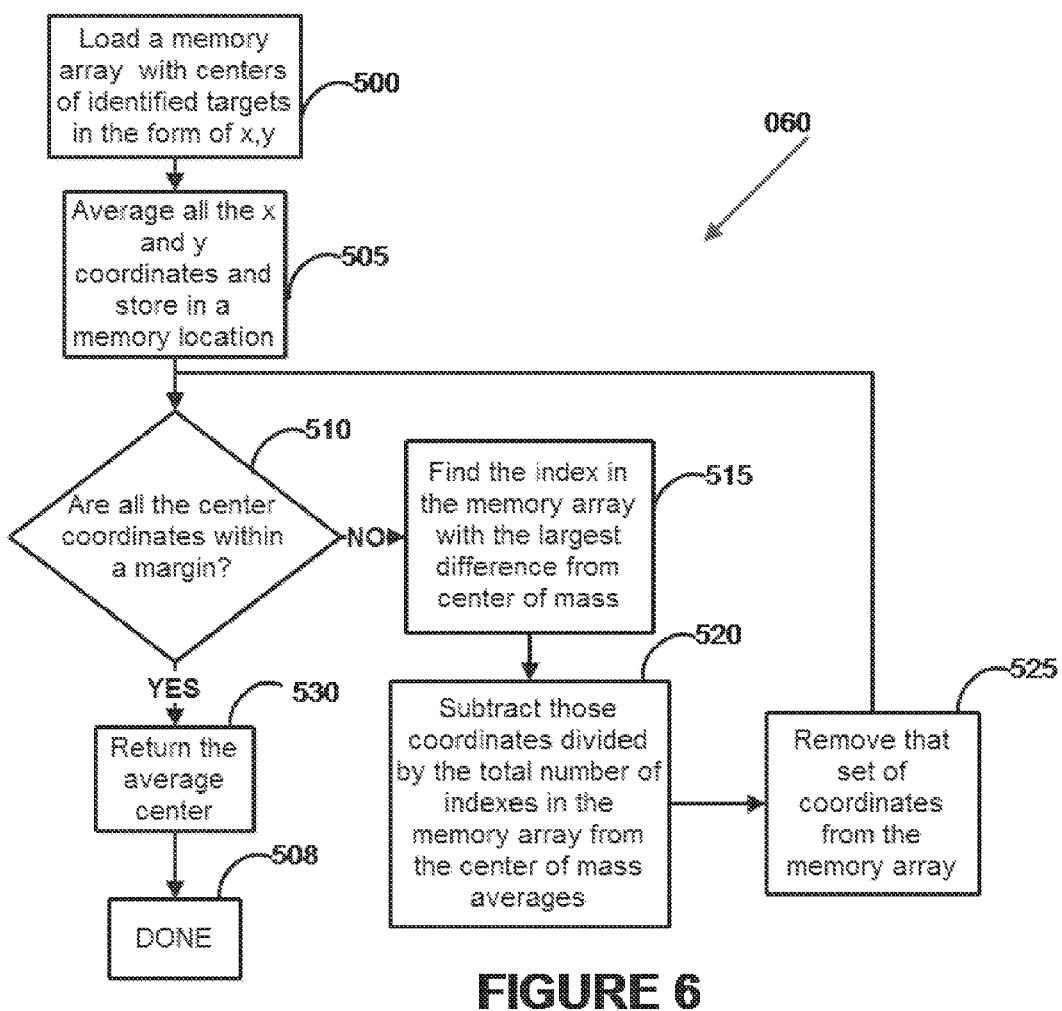
FIG. 6 shows the process of detecting concentric rectangles by rejecting rectangles whose geometric center is too far from the center of mass of the filtered rectangle list.

With reference to FIG. 6, once the list of candidate rectangles has been filtered for aspect ratio, a concentric shape detector 60 (FIG. 1) finds the center of the largest group of concentric rectangles in the image. In the FRC competition, there are typically several concentric rectangles around each target, especially since edge detection will mark lines at both the outer edge and inner edge of tape or paint used to mark the target, and the target itself may be a rectangular hole through which scoring elements enter. The nature of this configuration leads to the desirability of this part of the process. First, the center of all rectangles is determined by computing the average of x coordinates and the average of y coordinates 505. The geometric center of each individual rectangle is then compared to this average value, and if all rectangles fall within a narrow range of the average value then the process terminates and returns the center 510, 530. If this is not the case, then the rectangle with the center farthest from the center of mass is located 515 and eliminated from the list 525. The new average center is computed very rapidly by simply subtracting the x and y coordinates of the center of the eliminated rectangle from the sums of the x and y coordinates of all the rectangles 520. This process continues until there is only one rectangle remaining or if all the centers are within a small margin. The center of this rectangle is then considered to be the center of the concentric set of target rectangles and is returned 530 and the concentric shape detector 60 is done 508.

With reference to FIG. 1, once the concentric shape detector 60 has returned a result, targeting signals are generated and transmitted to robotic hardware 70, 75 for targeting action. The targeting signals contains, at a minimum, the center, x-y coordinates, of the detected set of concentric target rectangles. In some applications the result may also contain the actual coordinates of the four located corners of the rectangle. For example, distance to the target may be measured by using the keystone effect in which the top corners will be slightly farther apart than the bottom corners if the robot is underneath the target, and similarly if the robot is positioned at an angle to the left or right of the target then the distance between the upper and lower corners on the left will differ from the distance between the two corners on the right.

The aiming apparatus may be an actual physical aiming apparatus 70 that may consist of motors which change the attitude and position of a shooting mechanism. Aiming is most easily realized if the camera 15 which provides the targeting data is mounted directly on the shooting mechanism 70 and moves with it. This configuration allows the system to provide real time information on whether the target is centered properly in the camera's field of view. In this case, when the center of the concentric target rectangle location matches the center of the camera's field of view (which has previously been adjusted such that it matches the trajectory of the game elements launched by the shooter) then the shooter has been aimed successfully.

With continued reference to FIG. 1, alternatively or in conjunction with transmitting target location information to the robot aiming apparatus 70, the targeting information may be transmitted to a driver alert system 75. The driver alert system 75 provides information to human operators in order to assist with aiming. For example, one possible embodiment of a driver alert system consists of indicator lights that inform the human operator that the robot must be turned left or right to align with the target. In practice, both systems 70 and 75 are desirable. For example, an aiming apparatus 70 may have limits on how far it may turn a turret mounted shooter system, and if that limit is reached then a signal may need to be sent to the human operators to inform them that the robot must be turned to bring the automatic aiming system back into a mechanically feasible range. In addition, a driver alert system 75 can indicate to a human driver that the automatic aiming system has successfully locked on target.

It will be appreciated by those skilled in the art that a robot aiming apparatus may take into account physical aspects of targeting that are dependent on a game element and need not aim directly at the target in question. For example, a basketball must be shot into a basketball hoop with some "arc" because the goal is horizontal in a plane above the robot, and so the physical laws of projectile motion must be taken into account for proper targeting. In contrast, a projectile that travels at high speed into a hole in a wall structure can in effect be shot straight at the target without any appreciable arc. These details are highly application specific. The present invention provides an accurate and rapid computation of the location of a target rectangle with respect to the camera's field of view. How that information is used to aim a particular shooting system depends on the physics and details of the item to be launched by that system.

Furthermore, it will be appreciated by those skilled in the art that there is nothing special about starting with the upper left corner during the Exlon shape detection module 50, and the process may just as easily start from any of the four corners, can proceed either clockwise or counterclockwise, in several different variations. All such permutations of the corner search order are functionally equivalent, and the examples used in this description start at the upper left corner and proceed clockwise only to make the discussion concise and clear.

Pseudocode for one embodiment of the present invention is presented in Table 1 below. In order to make this pseudocode as simple and understandable as possible, it does not utilize multithreading for the computation of the subexlons. A person skilled in the art will recognize that the sub-exlon computations illustrated by this simple pseudocode exemplary embodiment may easily be instantiated as multiple threads of execution operating on different parts of the image in parallel (as shown in FIG. 1 blocks 30, 35 . . . 40), thus increasing the overall frame rate on processors that have threading or multicore architectures. This may be accomplished, for example, by initializing all sub-exlon array elements to some impossible value, such as −1, used to mark uncomputed positions. Then the individual sub-exlon threads (FIG. 1, blocks 30, 35 . . . 40) may operate on different sections of the image. When the Exlon shape detection thread 50 needs to know the value of a horizontal or vertical sub-exlon, it first checks to see if the given array value is the marker that indicates the value is not yet available, if this is the case, the Exlon shape detection thread 50 calls an on-demand sub-exlon calculator function 65 which immediately computes and stores the horizontal and vertical sub-exlon values and stores them in the appropriate sub-exlon arrays. The threads will skip over any values that have already been computed in this manner. In tests of the system, it was found that with a few sub-exlon threads running, the values are precomputed before they are needed by the Exlon shape detection thread the vast majority of the time.

Although the present invention has been described in relation to particular embodiments thereof, many other variations and other uses will be apparent to those skilled in the art, it is preferred, therefore, that the present invention be limited not by the specific disclosure herein, but only by the gist and scope of the disclosure.

TABLE 1

Pseudocode illustrating a simple non-threaded embodiment of the present invention

```
double black         //Threshold for what we consider black to be
double white         //Threshold for what we consider white to be
int pixellook        //how far vertically to search for horizontal corners
int margin           //allowance in seeking for corners
int lineerror        //allowance on line exlon value in case the line
                     //is not perfectly straight
array cenlist        //holds the centers of found centers
int exlonwidth       //width of sub-exlons
int exlonlength      //length of sub-exlons
two dimensional array exlonHoriz      //horizontal sub-exlons
two dimensional array exlonVert       //vertical sub-exlons
int ulX, ulY, urX, urY, llX, llY      //ul is upper left
                                      //ur is upper right, ll is lower left
struct center}
    int centerX, centerY
}
void main( ){
    while (true){
        Image = image taken from camera or loaded from memory
        Image = Image run through an edge detection process
        //now calculate all sub-exlons
        for(int x = 0; x<image_width – exlonlength; x++){
            for(int y = 0; y<image_height – exlonlength; y++){
                exlonHoriz[x][y] = exlonHorizCalc(x,y)
                    exlonVert[x][y] = exlonVertCalc(x,y)
            }
        }
        for(int x = 0; x<image_width – exlonlength; x++){
            for(int y = 0; y<image_height – exlonlength; y++){
                if(checkIfCorner(x,y)){
                    int cX = (urX+ulX)/2
                    int cY = (urY+llY)/2
                    add to cenlist a new struct with centerX = cX and
                    centerY = cY
                }
            }
        }
        center TrueCenter = FindTrueCenter( ) //true center is the
        // center of the concentric
        //rectangles in the image
    }
}
double exlonHorizCalc(x,y){
    double toReturn = 0.0
    for(int i = 0; i < exlonlength; i++){
        for(int j = 0; j < exlonwidth; j++){
            toReturn += gray scale value Image at
                pixel [x+i][y+j] normalized from 0 to 1
        }
    }
    return toReturn/exlonlength;
}
double exlonVertCalc(x,y){
    double toReturn = 0.0
    for(int i = 0; i < exlonlength; i++){
        for(int j = 0; j < exlonwidth; ]++){
            toReturn += gray scale value Image at
                pixel [x+j][y+i] normalized from 0 to 1
        }
    }
    return toReturn/exlonlength;
}
double exlonUL(x,y){ //upper left corner of a square
    return (exlonHoriz[x][y] + exlonVert[x][y+exlonwidth])/2
}
double exlonUR(x,y){ //upper right corner of a square
    return (exlonHoriz[x][y] + exlonVert[x+exlonlength][y+exlonwidth])/2
}
double exlonLL(x,y){ //lower left corner of a square
    return (exlonHoriz[x][y] + exlonVert[x][y–exlonwidth])/2
}
double exlonLR(x,y){ //lower right corner of a square
    return (exlonHoriz[x][y] + exlonVert[x+exlonlength][y–exlonlength–exlonwidth])/2
}
boolean checkIfCorner(x,y){
    boolean found = false
    state = FINDWHITE1
    while(state != QUIT){
```

TABLE 1-continued

Pseudocode illustrating a simple non-threaded embodiment of the present invention

```
            switch(state){
                case FINDWHITE1
                    if( exlonUR(x,y)a white){
                        state = FINDWHITE2
                        x += exlonwidth
                        y += exlonwidth
                    } else {
                        state = QUIT
                    }
                case FINDWHITE2
                    if( exlonUR(x,y) > (white+black)/2){ //looking for an intermediate
                                                  //value because of soft-edges
                        state = FINDBLACK
                        x += exlonwidth
                        y += exlonwidth
                    } else {
                        state = QUIT
                    }
                case FINDBLACK
                    if( exlonUR(x,y) < black){
                        state = FINDUR
                        ulX = x; //coordinates for upper left corner
                        ulY = y;
                    } else {
                        state = QUIT
                    }
                case FINDUR //looks for upper right corner
                for(int tempX = ulX; tempX < ulX+pixellook; tempX++){
                    for(int tempY = ulY-margin; tempY < ulY +margin; tempY++){
                        same logic in FINDWHITE1 through FINDBLACK,
                        but reversed and uses tempX and tempY instead of
                        x and y
                        if (upper right hand corner is found){
                            urX = tempX;
                            urY = tempY;
                            state = UPPERLINE
                        }else{
                            state = QUIT
                        }
                    }
                }
                case UPPERLINE
                    double lineval
                    for(int i = ulX; i < urX; i ++){
                        lineval += exlonHoriz[i][ulY]
                    }
                    if (lineval/(urX-ulX) < BLACK + lineerror){
                        state = FINDLL
                    }else{
                        state = QUIT
                    }
                case FINDLL
                    Modified logic from FINDUR which differs by swapping margin to the tempX loop
                    and pixellook to tempY loop
                    if (corner is found){
                        llX = tempX
                            llY = tempY
                            state = FINDLEFTLINE
                    }else{
                        state = QUIT
                    }
                case FINDLEFTLINE
                    Modified logic from FINDUPPERLINE which differs by changing to
                    exlonVert and starts from ulY to llY
                    if (there is a line){
                        found = true;
                    }
                    state = QUIT
            }
            return found
    }
    center FindTrueCenter( ){
        int cenMassX, cenMassY
        foreach center struct in cenlist{
            cenMassX += current struct centerX
                cenMassY += current struct centerY
        }
        cenMassX /= cenlist length
```

TABLE 1-continued

Pseudocode illustrating a simple non-threaded embodiment of the present invention

```
        cenMassY /= cenlist length
        int maxdis
        int index
        while(cenlist length > 1){
            for(int i = 0; i < cenlist length; i++){
                if(distance from cenlist[i] to cenMassX and cenMassY > maxdis){
                    maxdis = the distance
                        index = i
                }
            }
            cenMassX -= (cenlist[index].centerX / cenlist length)
            cenMassY -= (cenlist[index].centerY / cenlist length)
            remove cenlist[index] from the array
        }
        return cenlist[0]
}
```

What is claimed is:

1. A method for detecting at least one target rectangle in an image, the method comprising:
receiving, in an image memory, an image from an image source;
transforming the received image into a grayscale edge detection image;
transforming the grayscale edge detection image into a binary image using a threshold value;
determining horizontal and vertical sub-exlons for each picture element in the binary image;
generating horizontal and vertical sub-exlon arrays from the determined horizontal and vertical sub-exlons;
scanning the sub-exlon arrays to identify exlons for each of four corner types; and
identifying the at least one target rectangle using the identified exlons by confirming that one of each of four corner types are connected by horizontal and vertical lines.

2. The method of claim 1, further comprising
identifying a plurality of target rectangles;
storing a list of the plurality of target rectangles; and
removing all target rectangles from the target rectangle list whose aspect ratios are not consistent with an aspect ratio of a predetermined target rectangle, thus generating a filtered rectangle list.

3. The method of claim 2, further comprising
determining a set of concentric target rectangles by repeatedly removing from the list of target rectangles those target rectangles whose geometric centers are farthest away from the average of the geometric centers of the concentric target rectangles, this process being repeated until all remaining target rectangles have geometric centers closer than a threshold to average of the geometric centers.

4. The method of claim 3, further comprising
generating aiming signals in order to align a shooting mechanism with the set of concentric target rectangles remaining in the list; and
transmitting the aiming signals to an external aiming device.

5. The method of claim 4, wherein the external aiming device is a set of actuators that automatically align the shooting mechanism with the concentric target rectangles.

6. The method of claim 4, wherein the external aiming device is a set of signal lights that indicate to a human driver which direction a robot must be positioned in order to align with the concentric target rectangles.

7. The method of claim 1, wherein the image source is a camera.

8. The method of claim 1, wherein the image source is a computer file.

9. A system for aiming a robotic apparatus comprising:
an image source;
a memory that includes instructions for operating the system;
an aiming device; and
control circuitry coupled to the image source, coupled to the memory and coupled to the aiming device, the control circuitry capable of executing the instructions and is operable to at least:
receive an image from an image source and store the image in the memory;
transform the received image into a grayscale edge detection image;
transform the grayscale edge detection image into a binary image using a threshold value;
determine horizontal and vertical sub-exlons for each picture element in the binary image;
generate horizontal and vertical sub-exlon arrays from the determined horizontal and vertical sub-exlons;
scan the sub-exlon arrays to identify exlons for each of four corner types;
identify at least one target rectangle using the identified exlons by confirming that one of each of four corner types are connected by horizontal and vertical lines;
generate aiming signals in order to align a shooting mechanism with the at least one target rectangle; and
transmit the aiming signals to the aiming device.

10. The system of claim 9, wherein the control circuitry is further operable to execute the instructions to:
identify a plurality of target rectangles;
store a list of the plurality of target rectangles; and
remove all target rectangles from the target rectangle list whose aspect ratios are not consistent with an aspect ratio of a predetermined target rectangle, thus generating a filtered rectangle list.

11. The system of claim 10, wherein the control circuitry is further operable to execute the instructions to:
determine a set of concentric target rectangles by repeatedly removing from the list of target rectangles those target rectangles whose geometric centers are farthest away from the average of the geometric centers of the concentric target rectangles, this process being repeated until all remaining target rectangles have geometric centers closer than a threshold to average of the geometric centers.

12. The system of claim 11, wherein the aiming signals are generated in order to align a shooting mechanism with the set of concentric target rectangles remaining in the list.

13. The system of claim 11, wherein the aiming device is a set of actuators that automatically align the shooting mechanism with the concentric target rectangles.

14. The system of claim 11, wherein the aiming device is a set of signal lights that indicate to a human driver which direction the robotic apparatus must be positioned in order to align with the concentric target rectangles.

15. The system of claim 9, wherein the image source is a camera.

16. The system of claim 9, wherein the image source is a computer file.

17. A non-transitory computer-readable medium comprising a plurality of instructions that, when executed by a computer system, at least cause the computer system to:
  receive an image from an image source and store the image in the memory;
  transform the received image into a grayscale edge detection image;
  transform the grayscale edge detection image into a binary image using a threshold value;
  determine horizontal and vertical sub-exlons for each picture element in the binary image;
  generate horizontal and vertical sub-exlon arrays from the determined horizontal and vertical sub-exlons;
  scan the sub-exlon arrays to identify exlons for each of four corner types;
  identify at least one target rectangle using the identified exlons by confirming that one of each of four corner types are connected by horizontal and vertical lines;
  generate aiming signals in order to align a shooting mechanism with the at least one target rectangle; and
  transmit the aiming signals to an external aiming device.

18. The non-transitory computer-readable medium of claim 17, wherein the instructions further cause the computer system to:
  identify a plurality of target rectangles;
  store a list of the plurality of target rectangles; and
  remove all target rectangles from the target rectangle list whose aspect ratios are not consistent with an aspect ratio of a predetermined target rectangle, thus generating a filtered rectangle list.

19. The non-transitory computer-readable medium of claim 18, wherein the instructions further cause the computer system to:
  determine a set of concentric target rectangles by repeatedly removing from the list of target rectangles those target rectangles whose geometric centers are farthest away from the average of the geometric centers of the concentric target rectangles, this process being repeated until all remaining target rectangles have geometric centers closer than a threshold to average of the geometric centers.

20. The non-transitory computer-readable medium of claim 19, wherein the aiming signals are generated in order to align a shooting mechanism with the set of concentric target rectangles remaining in the list.

* * * * *